(12) United States Patent
Offerle et al.

(10) Patent No.: US 11,332,187 B1
(45) Date of Patent: May 17, 2022

(54) ELECTRIC MOTOR AND CONTROL UNIT COOLING SYSTEM

(71) Applicant: Ford Global Technologies, LLC, Dearborn, MI (US)

(72) Inventors: Timothy Gerard Offerle, Whitmore Lake, MI (US); Jonathan Edward Gunger, Plymouth, MI (US); Christopher Michael Paiva, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/952,010

(22) Filed: Nov. 18, 2020

(51) Int. Cl.
| | |
|---|---|
| *B62D 5/06* | (2006.01) |
| *B62D 5/04* | (2006.01) |
| *F01P 11/16* | (2006.01) |
| *F01P 1/06* | (2006.01) |
| *F01P 5/04* | (2006.01) |
| *F01P 7/04* | (2006.01) |

(52) U.S. Cl.
CPC .............. *B62D 5/064* (2013.01); *F01P 1/06* (2013.01); *F01P 7/048* (2013.01)

(58) Field of Classification Search
CPC ........ B62D 5/06; B62D 5/046; B62D 5/0409; B62D 5/063; F01P 11/16; F01P 3/12; F01P 5/04
See application file for complete search history.

(56) References Cited

U.S. PATENT DOCUMENTS

| | | | | |
|---|---|---|---|---|
| 4,518,055 | A * | 5/1985 | Yagi ....................... | B62D 5/065 180/422 |
| 5,398,505 | A * | 3/1995 | Oogushi ................. | B62D 5/07 137/118.07 |
| 6,092,618 | A * | 7/2000 | Collier-Hallman .... | B62D 5/065 180/422 |
| 6,711,776 | B1 | 3/2004 | Krause et al. | |
| 7,398,745 | B1 * | 7/2008 | White ...................... | F01P 5/14 123/41.01 |
| 7,694,775 | B2 | 4/2010 | Thoresen | |
| 9,321,479 | B2 | 4/2016 | Wankhede et al. | |
| 10,267,210 | B2 | 4/2019 | Villegas Muriel et al. | |
| (Continued) | | | | |

FOREIGN PATENT DOCUMENTS

CN 206374807 U 8/2017

*Primary Examiner* — Long T Tran
(74) *Attorney, Agent, or Firm* — Burr & Forman, LLP

(57) ABSTRACT

The present disclosure is directed to a cooling system for a system, such as an electric power assisted steering (EPAS) system and the components of such system, such as a motor. The cooling system includes a temperature sensor coupled to an electric motor of the EPAS system, one or more fluid reservoirs, and a fluid transfer device coupled to the motor and to the first fluid reservoirs. The fluid transfer device extends along a length of the motor. The cooling system further includes a pump coupled to the fluid reservoir and the fluid transfer device, a control unit coupled to the sensor and the pump. The control unit is configured to activate the pump in response to temperature detected by the sensor being greater than or equal to a first threshold motor temperature. The pump transfers the fluid in the fluid reservoirs to the fluid transfer device for absorbing the heat of the motor. The fluid transfer device is configured to contain the transferred fluid.

32 Claims, 7 Drawing Sheets

(56) References Cited

U.S. PATENT DOCUMENTS

| | | | | |
|---|---|---|---|---|
| 2005/0217260 A1* | 10/2005 | Desjardins | ............. | F16D 31/02 60/421 |
| 2018/0119595 A1* | 5/2018 | Villegas Muriel | ...... | F01P 7/048 |
| 2018/0339727 A1* | 11/2018 | Ueyama | ................. | B62D 5/065 |
| 2019/0248409 A1* | 8/2019 | Nishida | ................... | B62D 5/10 |

* cited by examiner

ELECTRIC MOTOR AND CONTROL UNIT COOLING SYSTEM

BACKGROUND

Technical Field

The present disclosure is directed to an electric motor and control unit cooling system for steering in high-demand conditions.

Description of the Related Art

Some vehicles are equipped with systems, such as an Electric Power Assisted Steering (EPAS or EPS) system, that assist a driver to steer the vehicle. Extended use of the EPAS system and/or high load/demand driving conditions, may cause the EPAS system and its components, such as an EPAS motor to approach a temperature or operational threshold of such system and components that should be avoided. Some methods to avoid exceeding the temperature threshold of the EPAS components and systems include reducing current in the EPAS system to zero and utilizing ambient air flow.

BRIEF SUMMARY

The present disclosure is directed to an automatic cooling system for an electronic power assisted steering (EPAS) system. The cooling system supports the EPAS system by cooling the EPAS system and related components. The EPAS system can provide a selected steering output by drawing an amount of current with the support of the cooling system to prevent exceeding a predetermined temperature threshold. The automatic cooling is achieved by a plurality of sensors that detect temperature and other conditions of the vehicle, such as a driver or a user-selected high-load mode (e.g., off-roading, rock crawling, bouldering). In response to exceeding one or more threshold conditions, such as the temperature within the EPAS system exceeding a temperature threshold, the cooling system will activate and move water or a liquid coolant from a reservoir.

The water may be condensation collected from an air-conditioning system or rainwater run-off. Alternatively, or in addition, the water may be from a windshield washer fluid reservoir. A minimum level of fluid will be maintained and monitored in the windshield washer fluid reservoir to avoid utilizing all fluid contained in the windshield washer reservoir.

The water may be moved in a closed loop system from the reservoir through a heat sink coupled to an interior or exterior of the EPAS system. In other configurations, the water may be sprayed on to the EPAS system.

Throughout the cooling process, the temperature of the EPAS system is monitored so that the cooling process can be maintained or stopped in response to the current status of the EPAS system.

In one embodiment, the system includes an electric power assisted steering motor, a first temperature sensor in the electric motor, and a first fluid reservoir. The system includes a fluid transfer device coupled to the electric motor and the first fluid reservoir. The fluid transfer device includes a channel that extends along a length of the electric motor. The system includes a first pump coupled to the fluid reservoir and the fluid transfer device. The system includes a control unit coupled to the first sensor and the first pump, the control unit configured to activate the first pump in response to temperature detected by the first sensor being greater than or equal to a first threshold motor temperature. As the fluid moves through the channel, heat is transferred away from the electric motor.

Alternatively, a vehicle includes an electric power assisted steering motor and a first fluid reservoir coupled to a side of the electric power assisted steering motor. This fluid reservoir may be an open collection receptacle that can collect any excess fluid that is sprayed or otherwise transferred to an exterior surface of the electric motor. The collection receptacle is a channel that extends along the side of the electric power assisted steering motor.

Instead of an open collection receptacle, the first fluid reservoir may be a closed system that has a serpentine channel that extends from one side of the electric motor to another side. The channel covers a surface area of an exterior of the electric motor to move heat away from the electric motor.

A first fluid path or input pipe and a second fluid path or outlet pipe are coupled to the first fluid reservoir. A second fluid reservoir may be coupled to the first fluid reservoir by the first fluid path and the second fluid path. The second fluid reservoir can include an opening for manual filling of this reservoir.

The present disclosure is directed to a method of automatically activating a cooling system of an electric power assisted steering (EPAS) motor in a vehicle. The method includes detecting a plurality of parameters of the vehicle, comparing the plurality of parameters to a plurality of thresholds, and activating the cooling system in response to at least one of the plurality of parameters exceeding a respective one of the plurality of thresholds.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

For ease of discussion, the present disclosure describes an automatic cooling system for a motor, such as an electric power assisted steering system motor, however, other motors, like brake motors, drive motors, parking brake motors, and sway bar motors may be integrated with and utilize the automatic cooling system.

Figure 1A:
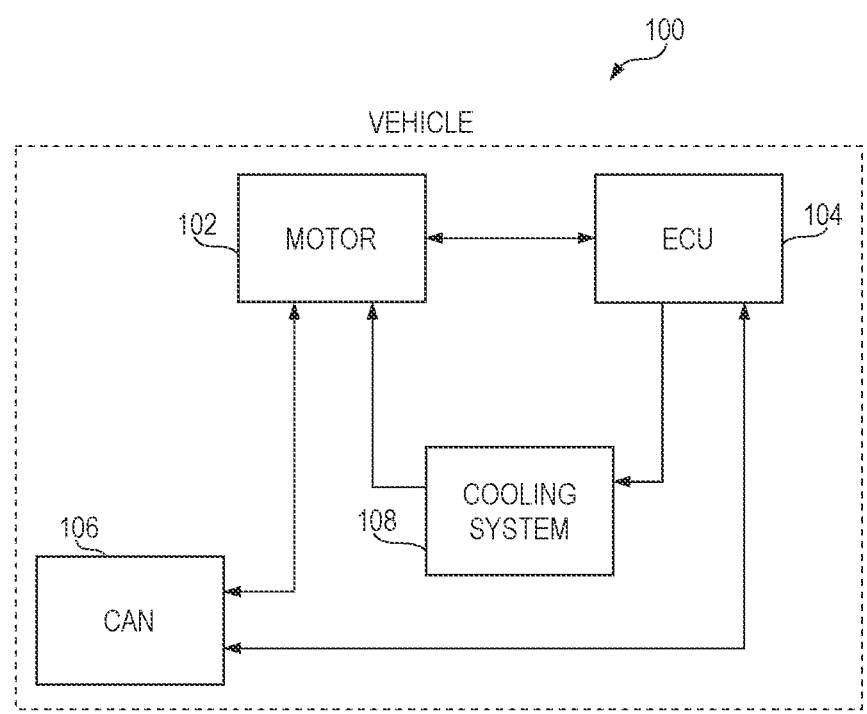
FIG. 1A is a block diagram of a vehicle in accordance with an embodiment of the present disclosure.
Figure 1B:
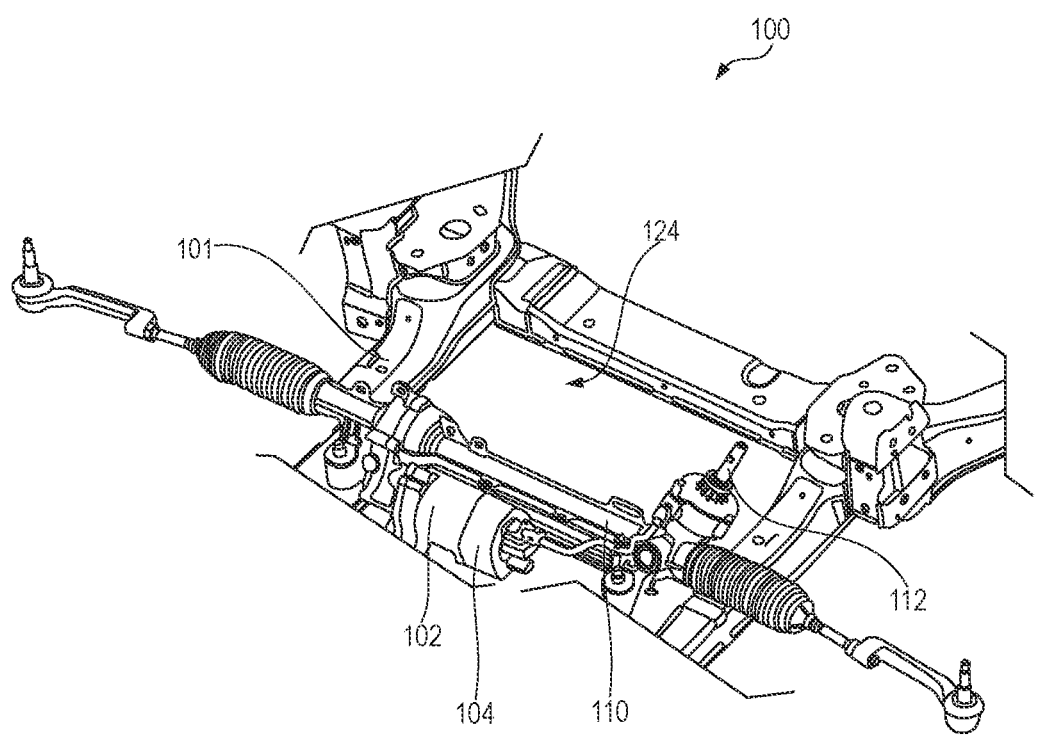
FIG. 1B is an Electric Power Assisted Steering (EPAS) motor in the vehicle in accordance with an embodiment of the present disclosure.

FIG. 1A is a block diagram of a vehicle 100 having a motor 102, an electronic control unit (ECU) 104, and a control area network (CAN) 106. A cooling system 108 is coupled to the motor and the ECU 104. FIG. 1B is a view of the motor, such as an Electric Power Assisted Steering (EPAS) motor 102 as positioned in the vehicle 100 between parts of a frame 101.

An EPAS system 124 includes the motor 102 and is configured to attenuate a driver's effort to steer the vehicle using a steering wheel that is coupled to a steering column 112. The EPAS system 124 employs the EPAS motor 102 to assist the driver in providing torque to control the direction of a set of steered wheels of the vehicle 100, thereby controlling the direction of the vehicle 100. The ECU 104 calculates the assistive torque to apply and instructs the EPAS motor 102 to apply the calculated assistive torque. As in FIG. 1B, the EPAS motor 102 in the vehicle 100 is positioned on a steering gear 110 that is connected to the steering column 112.

Modes or scenarios, for example, a rock-crawling mode, selectable drive modes like sand, mud, gravel, etc., repeated parking cycles, use of the vehicle in the desert or areas with high ambient temperature, race track requiring repetitive high-speed steering, are high load or high-demand conditions for the EPAS system 124. In another example, maneuvering the vehicle 100 around tight corners with heavy loads resulting in static steering cycles may be a high load conditions for the EPAS system 124. The high load conditions can raise the temperature of the EPAS system 124, specifically the EPAS motor 102. In order to maintain or continue using the EPAS motor without exceeding a temperature threshold, the cooling system is configured to dissipate the heat.

Referring back to FIG. 1A, the cooling system 108 for cooling the EPAS motor 102 and facilitating the heat dissipation is coupled to one or more sensors of the vehicle 100 that detect a plurality of parameters, such as but not limited to, speed of the vehicle 100, ambient temperature, status of an engine fan, and a selection of an extreme maneuver mode of the vehicle 100. Data from the plurality of sensors may be transmitted through the CAN 106 from different locations in the vehicle. The ECU 104 can receive the parameters corresponding to the EPAS motor 102 and the EPAS system 124, for example, temperature of the EPAS motor 102 and gear angle of the steering wheel. The ECU can analyze the parameters and activate or deactivate the cooling system according to the threshold configurations discussed below.

The CAN is an intravehicular communication network for transferring data corresponding to the plurality of parameters from the one or more sensors to the cooling system 108. The cooling system 108 receives the detected plurality of parameters of the vehicle 100 and EPAS system 124 and compares the detected parameters with a plurality of thresholds.

The cooling system 108 activates a cooling cycle in response to at least one of the plurality of parameters exceeding a respective one of the plurality of thresholds. The cooling system 108 activates the cooling cycle to cool the EPAS motor 102 approaching or exceeding the temperature threshold. The various embodiments of the cooling system 108 are described in FIGS. 2A through 5. The cooling system 108 may include any combination of steps or procedures that are a part of the cooling cycles described in the detailed description of FIG. 2A through 5.

The cooling system 108 includes one or more fluid reservoirs that transfer fluid into the EPAS motor 102 or over the EPAS motor 102 to cool the EPAS motor 102 during the cooling cycle. The fluid transferred to the EPAS motor 102 absorbs the heat to reduce the temperature of the EPAS motor 102. The cooling system 108 periodically or continuously monitors the plurality of parameters to ensure that the cooling cycle actively reduces the temperature of the EPAS motor 102. The cooling system 108 cools the EPAS motor 102 without reducing the current drawn by the EPAS system 124, and the EPAS system 124 continuously provides full output even with extreme use conditions and high temperatures.

The cooling system 108 automatically activates the cooling cycle to reduce the temperature of the EPAS motor 102 if it increases to a temperature threshold. In an embodiment, the cooling system 108 provides a notification to a driver or a user on a display module in the vehicle 100 or on a mobile device to allow the driver to manually activate the cooling cycle to cool the EPAS motor 102.

The cooling system 108 can be applied to other electric motors that have current drawn over a long period and a thermal limiting condition that effect the electric motor's performance due to high usage like the EPAS motor 102. The cooling system 108 can be used for other motors that are positioned under the hood of the vehicle 100 with extreme short-term duty cycles.

Figure 2A:
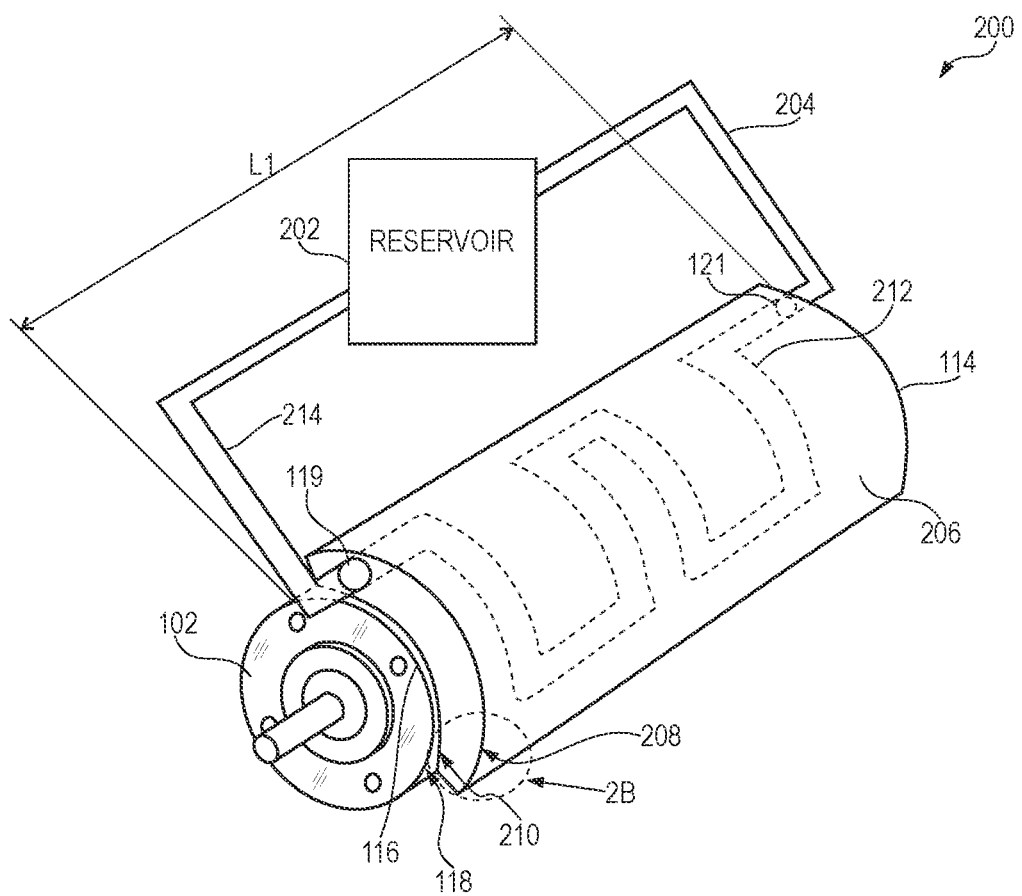
FIG. 2A is an embodiment of a cooling system coupled to the EPAS motor.
Figure 2B:
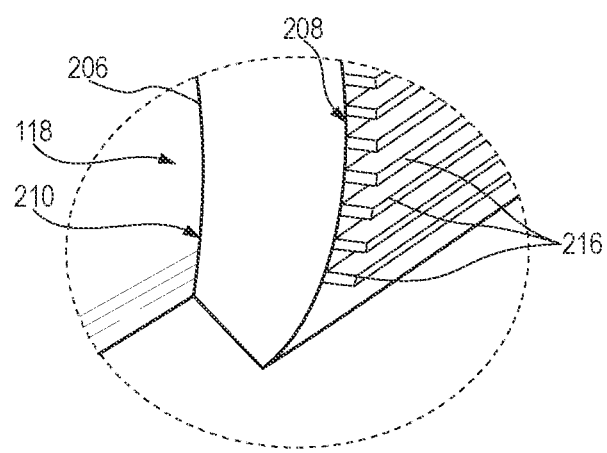
FIG. 2B is a magnified view of a portion of a fluid transfer device of the cooling system in FIG. 2A.

FIG. 2A is an embodiment of a cooling system 200 coupled to the EPAS motor 102. The cooling system 200 includes a fluid transfer device 206 coupled to an exterior surface 118 of the motor 102. FIG. 2B is a magnified view of an alternative embodiment of a portion of the fluid transfer device 206 having heat sink fins 216.

The fluid transfer device 206 includes a first surface 210 opposite to a second surface 208. The first surface 210 may be in direct contact with the EPAS motor 102, i.e., in contact with the surface 118. Alternatively, there may be a heat conductive paste, gel or adhesive between the first surface 210 and the exterior surface 118. The exterior surface may be a curved surface such that the fluid transfer device 206 is similarly curved. Said differently, the fluid transfer device may be sized and shaped to rest adjacent to or abutting the exterior surface of the EPAS motor.

The second surface 208 is distal to the EPAS motor 102. In one embodiment, the second surface is a planar surface such that the heat transfer properties are achieved by movement of fluid through a channel 212 that extends along a length L1 of the EPAS motor 102, between a first end 114 and a second end 116 of the EPAS motor 102. The channel 212 is positioned in between the second surface 208 and the first surface 210 of the fluid transfer device. In other words, the second surface 208 and the first surface 210 act as a housing for the channel 212. The housing may be formed of a heat transfer material to provide additional passive heat transfer away from the EPAS motor. Activating an engine fan or spraying water on the second surface can provide additional active heat transfer.

In an embodiment, the channel 212 is adjacent to an exterior surface 118 of the EPAS motor 102. The channel 212 is of a serpentine shape that extends from a first opening 119 to a second opening 121 of the fluid transfer device. The fluid transfer device 206 has a solid or other physical structure around the channel 212 that dissipates heat away from the exterior surface 118 of the EPAS motor 102 into the ambient air.

In an alternative embodiment, the fluid transfer device 206 includes a heat sink with multiple extensions or fins 216. The extensions 216 are coupled to or otherwise extend from the second surface 208 of the fluid transfer device 206. The extensions 216 extend away from the EPAS motor 102. The presence of the extensions 216 provide greater contact area to another fluid, such as air, to pass in between the extensions 216 for cooling the second surface 208. In an example, one or more fans are positioned in the under-hood region of the vehicle 100 to direct the air onto the extension 216 to facilitate cooling. The fans can be auxiliary fans with a specific purpose of cooling the EPAS motor 102 or fans that are coupled to other systems of the vehicle 100. In another example, the air is directed to the fluid transfer device 206 or the extensions 216 through one or more active air vents.

The fluid transfer device 206, is made of any material with high conductivity, for example, aluminum. The fluid transfer device 206 is coupled to the EPAS motor 102 by one or more fasteners, such as a bolt, or a screw. In an embodiment, the fluid transfer device 206 can be retrofitted for off-roading types of vehicles.

In an embodiment, the fluid transfer device 206 includes multiple channels 212 along the length L1 and between the first end 114 and the second end 116. In another embodiment, the channel 212 is manufactured within the EPAS motor 102 (e.g. such as by additively manufacturing or sand casting such channels into the housing) and the fluid is moved within the channel 212. In yet another embodiment, the fluid transfer device 206 or the first fluid reservoir is coupled to a side of the EPAS motor 102 and includes a cavity or a chamber without the channel 212. The cavity is filled with the fluid from the fluid reservoir 202 or the second fluid reservoir, to absorb the heat from the exterior surface 118 of the EPAS motor 102. The channel 212 is a continuous channel that facilitates avoiding external leakage of fluid.

The cooling system 200 may include a controller or processor capable of storing data, transceiving data, executing computer programs or a series of commands, instructions, or state transitions to activate the cooling system when the EPAS motor is reaching or exceeds a threshold operating temperature. The controller, in an embodiment, includes a memory unit for storing programs, threshold data, etc. In another embodiment, the memory unit for storing programs and the threshold data is externally located from the controller, such as in the ECU 104.

The cooling system 200 includes a fluid reservoir 202 coupled to the controller and the fluid transfer device 206. The controller is configured to activate the fluid transfer under the appropriate conditions of the vehicle and EPAS system. The fluid reservoir 202 includes an electronically operated valve that acts as an outlet of the fluid reservoir 202. The fluid reservoir 202 stores fluid such as water or other liquid coolants. The fluid transfer device 206 is coupled to the fluid reservoir 202 by a first pipe 204 and a second pipe 214. The fluid transfer device 206 may be a first fluid reservoir as fluid may be maintained in the fluid transfer device at all times and moved when a threshold condition is experienced. The fluid reservoir 202 may be a second fluid reservoir in this configuration.

The fluid reservoir 202 may be a windshield washer fluid reservoir or a separate fluid reservoir. The fluid reservoir 202 can be manually filled with tap water by a human. Alternatively or additionally, condensed water may be collected from an air-conditioning system of the vehicle 100, rainwater run-off may be collected, or other methods of fluid collection can be employed to keep fluid in the fluid reservoir 202.

The fluid reservoir 202, in an embodiment, may be positioned near a wheel well region of the vehicle 100, which can provide less impeded access to ambient air. Alternatively, the fluid reservoir 202 may be in a fender area of the vehicle 100 and is spaced from a temperature of an under-hood region of the vehicle 100.

During the cooling cycle, the controller activates the electronically operated valve of the fluid reservoir 202 and the fluid in the fluid reservoir 202 is transferred or moved to the channel 212 in the fluid transfer device 206 through the first pipe, a first fluid path 204. As the fluid moves along the length L1 from the first end 114 to the second end 116 of the EPAS motor 102, the fluid absorbs or transfers the heat from the exterior surface 118 of the EPAS motor 102. The heated fluid exits the fluid transfer device 206 through the second pipe, a second fluid path 214 and back to the fluid reservoir 202. The circulation of the fluid from and to the fluid reservoir 202 may be achieved by a thermosiphon effect or with a pump. The recirculation of the fluid to the fluid reservoir 202 could ensures that the fluid reservoir 202 does not run out of the fluid.

In some embodiments, the cooling system 200 does not include the second fluid path 214 and the fluid transferred from the first end 114 and the second end 116 is discarded and not circulated back to the fluid reservoir 202.

The cooling system 200 may include multiple fluid reservoirs that transfer fluid to the channel 212 sequentially during the cooling cycle. This allows recently circulated warm fluid to cool off before recirculating the fluid into the channel 212. The fluid reservoirs may or may not be coupled to a pump system for transferring fluid from and to the fluid reservoirs.

The fluid reservoir 202 may include a volume sensor that monitors a fluid level. The volume sensor provides data corresponding to the fluid level to the controller. If the controller determines that the fluid level is below a volume threshold, then the controller starts or continues the cooling cycle by switching the engine fan on until the temperature of the EPAS motor 102 reduces below the first threshold, for example. However, if the EPAS motor temperature continues to increase over a determined period, the controller may provide a temperature threshold warning signal if no other cooling techniques remain available.

The EPAS system 124, includes a first temperature sensor 120 (described in FIGS. 4 and 5), also referred to as an EPAS motor temperature sensor, for detecting the temperature of the EPAS motor 102. The first temperature sensor may be part of a controller module within the EPAS motor or may be a standalone sensor configured to detect an internal temperature of the EPAS motor. In an example, the first temperature sensor 120 is a thermistor. The controller is coupled to the first temperature sensor 120 to receive the detected temperature or a first temperature of the EPAS motor 102, which may be through the CAN 106. Upon receiving the first temperature data, the controller determines if the first temperature is above or below one or more threshold motor temperatures, as described in FIG. 6. Upon determining that the first temperature is greater than or equal to a first threshold motor temperature, the ECU 104 provides a signal or raises a message flag to the controller or requests the controller to activate the cooling cycle.

The ECU 104 also determines if the first temperature is beyond the thermal capacity of the EPAS system 124. The ECU 104 provides a signal or raises a message flag to the controller or requests the controller to activate the cooling cycle upon determining that the first temperature is equal or above the thermal capacity of the EPAS system 124. The ECU 104 can regulate the cooling by proactively requesting the activation of the cooling cycle, such as if the temperature is approaching a threshold temperature and a high-demand mode has been selected.

In an embodiment, the fluid reservoir 202 includes a pump system that is coupled to the controller. The controller is configured to activate the pump system in response to the first temperature being greater than or equal to the first threshold motor temperature. The pump system pushes, moves, or otherwise transfers the fluid in the fluid reservoir 202 to the channel 212 through the first fluid path 204. A second fluid pump system for transferring the fluid in the channel 212 to the fluid reservoir 202 through the second fluid path 214 may be included.

The controller can also receive data from multiple sensors corresponding to other parameters such as speed of the vehicle 100, gear angle of the steering wheel components, ambient temperature, and status of an engine fan. The controller determines if the one or more parameters are above or below corresponding thresholds. The controller activates the cooling cycle based on a number of parameters meeting the conditions described in more detail in FIG. 6.

In an alternative embodiment, a coolant from another system in the vehicle can be coupled to the fluid transfer device 206, such as a coolant that is used for a lithium ion batteries could be used to cool the EPAS motor. The coolant could be routed to the EPAS motor after cooling the batteries and moved through a variety of pipes or fluid transfer paths to dissipate heat. The reservoir 202 may represent the cooling system of the battery, showing the transfer of the coolant from the battery to the motor 102 and back to the battery.

Figure 3:
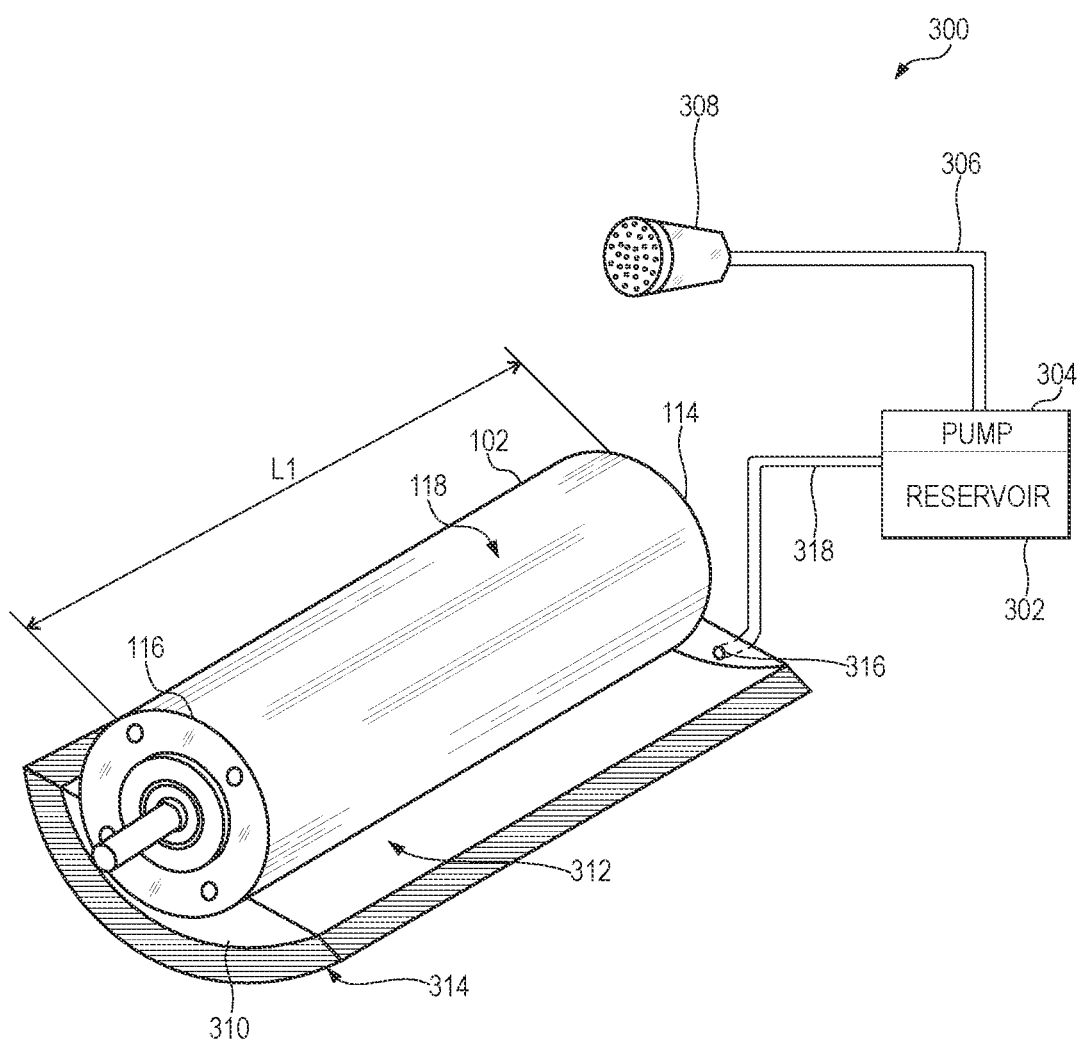
FIG. 3 is an embodiment of a cooling system coupled to the EPAS motor.

FIG. 3 is an embodiment of a cooling system 300 coupled to the EPAS motor 102 that includes a trough or collection reservoir as the fluid transfer device 310. A fluid reservoir 302 having a first pump 304 is coupled to a control unit that is configured to receive activation or deactivation control signals in response to parameters and thresholds indicating a thermal status of the motor.

The fluid reservoir 302 stores a fluid such as water or other liquid coolant. The fluid reservoir 302 may be a windshield washer fluid reservoir used for both wiper fluid distribution and EPAS cooling in specific circumstances. Alternatively, the fluid reservoir 302 may collect condensed water from an air-conditioning system, rainwater run-off, or passive water collection.

A sprayer 308 is coupled the fluid reservoir 302 and is positioned to spray or spatter fluid on the exterior surface 118 of EPAS motor 102. The cooling system 300 includes a fluid transfer device 310, which is an open reservoir coupled to the bottom of the EPAS motor 102. The fluid transfer device 310 extends along the length L1 from the first end 114 to the second end 116 of the EPAS motor 102. The fluid transfer device 310 includes a first surface 312 proximal to the exterior surface 118 and a second surface 314 distal to the EPAS motor 102. The first surface 312 is configured to collect and contain the fluid after being sprayed on the EPAS motor. The first surface 312 includes an opening 316 that acts as an outlet of the fluid transfer device 310. The collected fluid can be moved back into the reservoir as a closed or semi-closed system.

Upon detection of a potential temperature threshold event, by detecting the various parameters of the present disclosure, the control unit activates the pump 304 and transfers the fluid from the fluid reservoir 302 to the sprayer 308 through a first fluid path or pipe 306. The sprayer 308 sprays or drips the fluid on the exterior surface 118 of the EPAS motor 102. The system may include a plurality of sprayers positioned to provide fluid to different locations of the EPAS motor. The fluid sprayed on the EPAS motor 102 transfers the heat from the exterior surface 118 towards the first surface 312 of the fluid transfer device 310. The collected warm fluid exits the fluid transfer device 310 from the opening 316 on the first surface 312 and flows into the fluid reservoir 302 through a second fluid path 318. The cooling system 300 may include another pump that moves the fluid from the fluid transfer device 310 to the fluid reservoir 302 through the second fluid path 318. This is one arrangement to retain and recirculate fluid within the cooling system.

The second fluid path may be omitted such that the collected fluid may exit the fluid transfer device 310 from the opening 316 on the first surface 312 and is not circulated. The fluid transfer device 310 is also optional in that the sprayed fluid on the EPAS motor 102 will evaporate or otherwise fall away from the motor after spraying.

Figure 4:
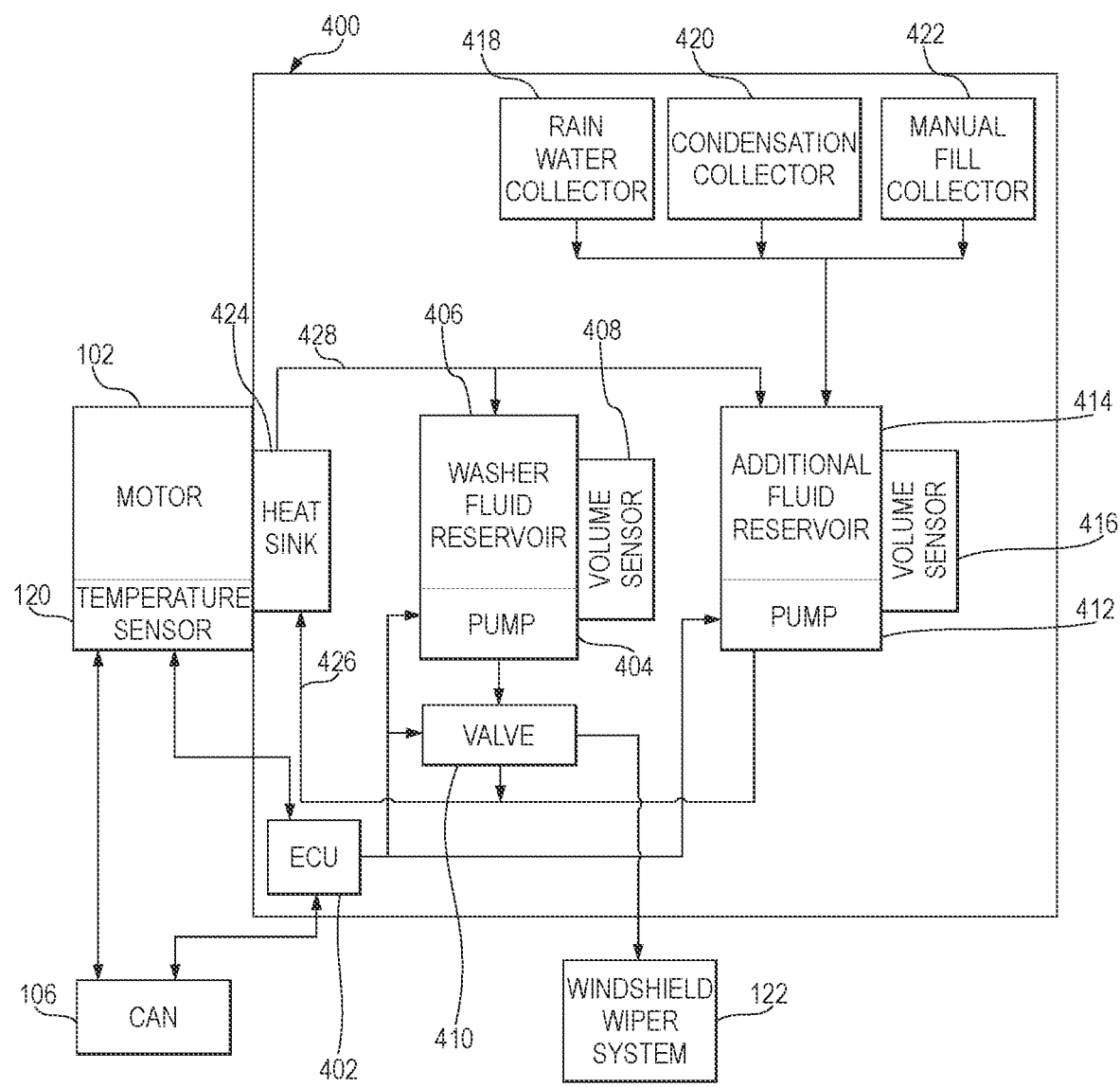
FIG. 4 is block diagram of an embodiment of a cooling system.

FIG. 4 is a block diagram of a cooling system 400 according to the present disclosure that is coupled to an EPAS motor 102 in a vehicle. A heat sink 424 or other fluid transfer device is coupled to the EPAS motor 102. The heat sink 424 may be a passive heat sink or an active fluid transfer system in line with the present disclosure. The cooling system includes a first fluid reservoir 406 and a second fluid reservoir 414. The first fluid reservoir 406 may be a washer fluid reservoir 406 with a first pump 404 coupled to an ECU 402. The washer fluid reservoir 406 stores windshield washer fluid that is ejected through one or more nozzles to a windshield of the vehicle 100 in one use case. When the temperature threshold condition is exceeded, the washer fluid reservoir 406 may transfer fluid to the heat sink by a sprayer or through a channel.

The ECU 402 is coupled to a temperature sensor 120 coupled to the motor 102, the pump 404, and other components of the system. The ECU 402 controls the activation and deactivation of the cooling system when monitored thresholds are exceeded. The ECU includes memory and other integrated circuits to receive, process, store, and execute programmed processes and algorithms associated with the cooling system. A plurality of threshold measurements are stored in the ECU 402 for comparison during use of the EPAS motor to monitor the temperature, compare it to predefined thresholds and activate the cooling system if required.

The first pump 404 is coupled to a valve 410 that may be a pressure sensitive valve or may be controlled by the ECU 402. The valve 410 controls whether the fluid in the washer fluid reservoir 406 is provided to the windshield washer system 122 or is provided towards the EPAS motor 102 through the cooling system.

The second fluid reservoir 414 is an additional, second fluid reservoir 414 with a second pump 412, coupled to the ECU 402. The additional fluid reservoir 414 may be the only reservoir in the cooling system or may be a secondary reservoir to support the washer fluid reservoir in the event the fluid level of the reservoir is too low. The second fluid reservoir may receive the fluid from a rainwater collector 418 that collects rainwater from surfaces of the vehicle 100. In addition or alternatively, other sources can provide fluid to the second fluid reservoir, such as a condensation collector 420 that collects water or condensation from an air conditioner of the vehicle 100 or a manual fill collector 422 that includes an opening for facilitating manual filling with water or coolant. A filter or a filtering mechanism may be included to prevent debris from the one or more sources from entering the additional fluid reservoir 414.

The ECU may activate the cooling cycle based on the first temperature exceeding a threshold operating temperature for the EPAS motor. In an embodiment, the ECU 104 of the vehicle is coupled to and communicates with the ECU 402 of the cooling system. The ECU 104 may provide a signal or raises a message flag to the ECU 402 of the cooling system 400 to activate the cooling cycle, as described FIG. 2A. Alternatively, the ECU 104 directly activates one of the first pump 404 or the second pump 412, upon determining that the first temperature is greater than or equal to the first threshold motor temperature.

The washer fluid reservoir 406 may be coupled to a first volume sensor 408 that detects, continuously or periodically, a fluid level in the washer fluid reservoir 406. The first volume sensor 408 is coupled to the ECU 402 and provides the fluid level data to the ECU 402 either directly or through the CAN 106. The ECU 402 compares the detected fluid level with a threshold fluid level, for example, availability of at least 25 percent of the fluid in the washer fluid reservoir 406. If the ECU 402 determines that the fluid level of the washer fluid reservoir 406 is less than or equal to the threshold fluid level, the ECU 402 deactivates the first pump 404. The ECU 402 either continuously or periodically is monitoring the fluid level in the additional fluid reservoir 414 with a second volume sensor 416. The second volume sensor 416 is coupled to the ECU 402 and provides the fluid level data to the ECU 402 either directly or through the CAN 106. Upon determining that the fluid level of the additional fluid reservoir 414 is greater than the threshold fluid level, the ECU 402 can activate the second pump 412 if the EPAS motor continues to be in the temperature avoidance condition.

In an alternate implementation, the ECU 402 may initially activate the second pump 412 associated with the second fluid reservoir 414 in response to the threshold temperature, such that the cooling system is activating fluid transfer. The second pump 412 moves the fluid in the additional fluid reservoir 414 to the heat sink 424 through a first fluid path 426. In some embodiments, the heated fluid exits the heat sink 424 through a second fluid path 428 and returns to the additional fluid reservoir 414. As some of the fluid will evaporate or will not be returned to the additional fluid reservoir 414, the second volume sensor can monitor the fluid level.

If the ECU 402 determines that the fluid level of the additional fluid reservoir 414 is less than or equal to the threshold fluid level, the ECU 402 deactivates the second pump 412. When the cooling system includes the washer fluid reservoir, the ECU 402 may proceed to determine the fluid level in the washer fluid reservoir 406 from the first volume sensor 408. If the fluid level of the washer fluid reservoir 406 is greater than the threshold fluid level, the ECU 402 activates the first pump 404.

However, if the ECU 402 determines that fluid levels both in the washer fluid reservoir 406 and the additional fluid reservoir 414 are less than the threshold fluid level, the cooling system can instruct the components available to continue to cool the EPAS motor, such as the engine fan, current gear angle, etc. If the engine fan is OFF and the temperature of the motor is still too high, then the ECU 402 may activate the engine fan. The ECU 402 receives data corresponding to the ambient temperature, selection of driving mode from a high-demand selection module or a vehicle mode module, and a fan control module of the vehicle 100. Based on the current temperature of the motor and if the ambient temperature is greater than the threshold ambient temperature, the selected mode is the extreme maneuver mode, and the engine fan is OFF, the ECU 402 will activate a plurality of the cooling strategies either alone or in combination while continuing to monitor the temperature of the EPAS motor.

Figure 5:
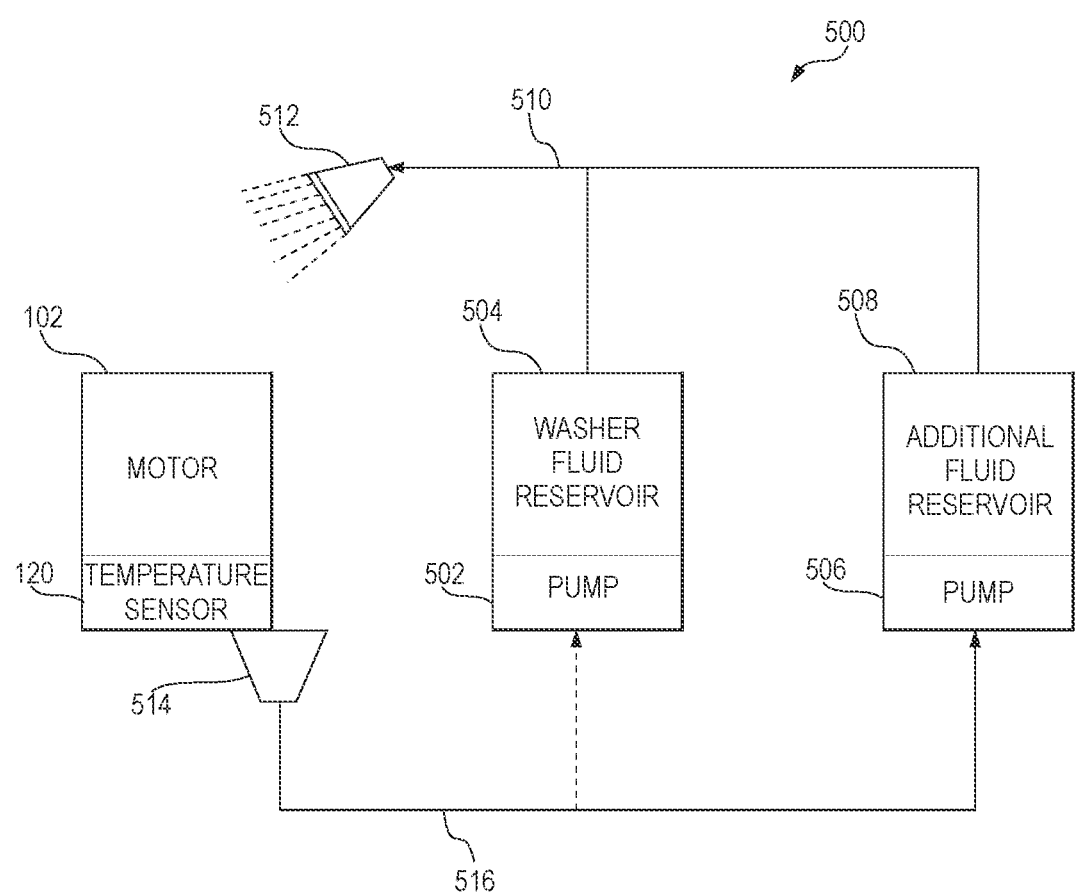
FIG. 5 is an alternate embodiment of a cooling system.

FIG. 5 is an alternate embodiment of a cooling system 500 that a washer fluid reservoir 504 and an additional fluid reservoir 508. The washer fluid reservoir may be a first fluid reservoir, with a first pump 502 that is coupled to a control unit. The additional fluid reservoir 508, is a second fluid reservoir, with a second pump 506 that is coupled to the control unit.

The cooling system 500 includes a sprayer 512 coupled to the washer fluid reservoir 504 and the additional fluid reservoir 508 for spattering, spraying, or dripping fluid on the EPAS motor 102. The cooling system 500 includes a run-off collector 514 that is an open reservoir coupled to a bottom or side of the EPAS motor 102. The run-off collector 514 can also be referred as a fluid transfer device or a fluid reservoir and is similar to the fluid transfer device of the present disclosure. The run-off collector 514 includes an opening that acts as an outlet that may return collected fluid to the washer fluid reservoir or the second reservoir. The run-off collector 514 is coupled to the EPAS motor 102 by one or more fasteners, such as bolts, screws, etc.

During the cooling cycle, the control unit, can activate the first pump 502 in response to the first temperature being greater than or equal to the first threshold motor temperature alone or in conjunction with other temperature threshold indicators. The second pump can be activated first based on the design constraints of the vehicle. As an example, the first pump 502 moves the fluid to the sprayer 512 through a first fluid path 510 to spray or drip the fluid on the exterior surface 118 of the EPAS motor 102.

The fluid sprayed on the EPAS motor 102 absorbs or otherwise transfers the heat from the exterior surface 118 and travels towards the run-off collector 514. The collected fluid exits the run-off collector 514 from the opening and flows into the washer fluid reservoir 504 through a second fluid path 516. Alternatively, the heated fluid is not circulated back to the washer fluid reservoir 406 and is only provided back to the second fluid reservoir 508.

Figure 6:
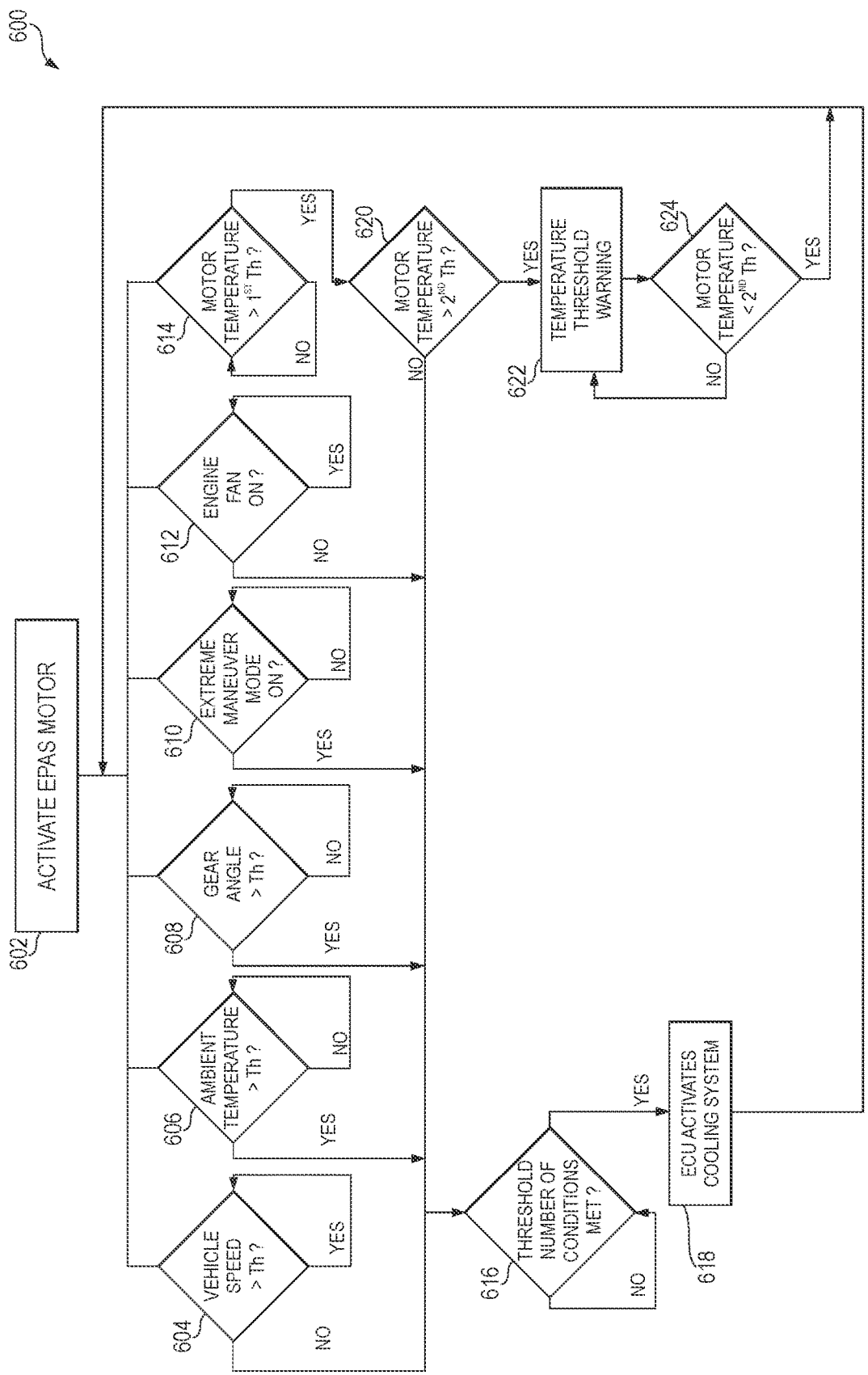
FIG. 6 is a flow chart of method for activating a cooling system of an EPAS motor in accordance with an embodiment of the present disclosure.

FIG. 6 is a flow chart for a method 600 for activating a cooling system of the EPAS motor 102 to monitor and react to approaching or passing a threshold operating temperature. Instructions for carrying out the method 600 may be executed by a controller based on instructions stored in non-transitory memory and in conjunction with signals received from sensors coupled to systems of the vehicle 100, for example, EPAS system 124. While described with reference to the systems depicted in FIGS. 1A through 5, it should be understood that method 600 or similar methods may be applied to other systems without departing from the scope of this disclosure. The method 600 includes detecting a plurality of parameters of the vehicle 100 and comparing the plurality of parameters to a plurality of thresholds. The controller activates the cooling system in response to one or more of the plurality of parameters meeting conditions as described in the subsequent paragraphs.

The method 600 begins at step 602 and includes determining that the EPAS motor 102 has been activated. The controller receives multiple parameters corresponding to the vehicle 100 either simultaneously or periodically based on a significance of each parameter. In step 604, the controller compares a first parameter, a detected speed of the vehicle 100 with a threshold speed. When the detected speed is greater than the threshold speed, sufficient air may be flowing in an under-hood region of the vehicle 100 such that passive cooling of the EPAS motor 102 may occur. If no other parameters are indicating a threshold temperature situation, the cooling system may not be activated. If the detected speed is less than the threshold speed, then insufficient air flow may be passing through the under-hood region. This slow speed is a first trigger to be considered at step 616, which is evaluating a number of threshold conditions and prioritizing parameters that are indicative of reaching or exceeding a threshold operating temperature.

In step 606, the controller compares a second parameter, a detected ambient temperature, that is, with a threshold ambient temperature. When the ambient temperature is below the threshold ambient temperature, the ambient air conditions may be sufficient to cool the EPAS motor. However, in an event that the detected ambient temperature is greater than the threshold ambient temperature, the ambient temperature may not contribute to the cooling of the EPAS motor 102 and this trigger or flag is evaluated at step 616 with other flags, triggers, or exceeded threshold conditions.

In step 608, the controller compares a detected gear angle or a steering angle with a gear angle threshold. If the detected gear angle has been past the threshold gear angle for a period of time, for example five second or more a trigger is transmitted to step 616 and activation of the cooling system may be triggered. If the detected gear angle is less than the gear angle threshold or if the gear angle has not exceeded the threshold over the period of time, then additional cooling of the EPAS motor 102 may not be utilized. More particularly, if the steering wheel is turned all the way to the left and held there for a period of time, heat can be generated in the motor and could indicate that the vehicle is stuck on a boulder. Alone or in combination with other parameters, the cooling system may be activated.

In step 610, the controller determines if an extreme maneuver mode is selected. A system of the vehicle 100 provides a button or displays a menu that includes the extreme maneuver mode along with other modes of driving. The menu may include one or more high-load or high-demand modes, such as bouldering, rock crawling, etc., that can be categorized as the extreme maneuver mode. The system receives a selection of the mode of driving and provides the selection to the controller. Selection of the extreme maneuver mode indicates that exceeding a temperature threshold condition is more likely than a standard or non-extreme maneuver mode. A frequency of polling or analysis of the parameters may be increased when the extreme maneuver mode is selected.

In step 612, the controller determines if the status of the engine fan is off or on. If the engine fan is on and the EPAS motor has been exceeding the threshold temperature for some time, the controller may trigger a temperature threshold warning signal, such as in step 622. In other situations, if the motor temperature is high and the engine fan is not on, the controller can activate the engine fan. The temperature threshold warning signal may be provided to the driver or to the vehicle's central processing unit.

In step 614, the controller compares a detected motor temperature (the first temperature) with a lower threshold motor temperature (the first threshold motor temperature). If the detected motor temperature is less than the lower threshold, then the EPAS motor 102 is not in an overheat situation. However, if the detected motor temperature is greater than the lower threshold motor temperature, then the controller compares the detected motor temperature with an upper threshold motor temperature (the second threshold motor temperature), in step 620.

If the detected motor temperature is greater than the lower threshold temperature, but less than the upper threshold motor temperature, the EPAS may be indicating that a temperature event is possible. Exceeding the lower threshold temperature is one of the parameters indicative of a potential temperature event and is compared in step 616 with the other conditions of the system. If, however, the detected motor temperature is greater than or equal to the upper threshold motor temperature, the controller proceeds to step 622 and warns the driver that the temperature threshold has been exceeded.

Upon such warning, the controller proceeds to step 624 and compares the detected motor temperature with the upper threshold motor temperature. If the detected motor temperature is greater than or equal to the upper threshold motor temperature, the controller continues to warn the driver until the temperature is below the upper threshold temperature. The driver can stop the extreme maneuver and allow the cooling system to reduce the operating temperature to below the threshold level.

If the temperature of the EPAS motor 102 is between a first and second threshold temperatures and if the EPAS motor 102 is not actively cooled and the temperature is not maintained, then a warning may be given. The controller continues to compare until the detected motor temperature is determined to be less than the upper threshold motor temperature.

In step 616, the controller determines if a threshold number of conditions are met. If a combination of the conditions corresponding to the steps 604, 606, 608, 610, 612, 614, or 620 are met, the controller evaluates the triggered conditions and determines whether to activate the cooling system. The determination may be based on a number of conditions that are met are equal or greater than the threshold number of conditions or the determination may be based on whether certain priority conditions have been exceeded, such as motor temperature, gear angle, and ambient temperature.

The cooling cycle includes transferring fluid from one or more fluid reservoirs into the EPAS motor 102 or over the EPAS motor 102 to reduce the first temperature of the EPAS motor 102, as described in FIGS. 2A through 5. The controller may consider satisfaction of any combination of conditions in steps 604, 606, 608, 610, 612, 614, and 620 for computation of the number of conditions that are met.

In an example, the threshold number of conditions is equal to one. If at least one of the conditions corresponding to steps 604, 606, 608, 610, 612, 614, and 620 are met, then the controller proceeds to step 618 and activates the cooling cycle. The method may activate different aspects of the cooling cycle based on which condition has been met. For example, if the only parameter exceeding the threshold is ambient temperature, the cooling system may activate the engine fan and continue to monitor the other conditions. Motor temperature is the most important temperature to monitor. As such, is some implementations, the threshold number of conditions is at least two.

If the conditions corresponding to the steps 610 and 614 are met or satisfied, that is the selection of the extreme maneuver mode is active and the first temperature exceeds the lower threshold motor temperature, then the controller activates the cooling cycle. If the conditions corresponding to the steps 608 and 604 are met or satisfied, that is the gear angle or the steering torque is greater than the threshold gear angle or the threshold torque respectively and the vehicle speed is less than the threshold speed, then the controller may determine the vehicle is in a stall state and activates the cooling cycle.

Other combinations of the parameters may trigger the cooling system. If the conditions corresponding to the steps 604, 610, and 614 are met or satisfied, that the extreme maneuver mode is active, the speed is below the threshold speed, and the first temperature exceeds the lower threshold motor temperature, then the controller activates the cooling cycle.

The controller can activate a polling sequence for detecting the status or value of the parameters in real-time, upon determining that extreme maneuver mode is selected. The polling sequence includes detecting the first temperature of the EPAS motor 102, the speed of the vehicle 100, the ambient temperature, the gear angle or a steering wheel angle, and the status of the engine fan. The controller retrieves the detected parameters over the communication network, such as CAN 106, and compares the detected parameters with the corresponding thresholds. If the controller determines that the gear angle or the steering wheel angle is greater than the threshold gear angle or the threshold steering angle for a time period greater than a threshold time period, then the controller increases a frequency of the polling sequence and activates the cooling cycle.

In another embodiment, the controller retrieves data corresponding to the various parameters simultaneously, upon determining that extreme maneuver mode is selected. The first temperature of the EPAS motor 102, the speed of the vehicle 100, the ambient temperature, the gear angle or a steering wheel angle, and the status of the engine fan are simultaneously detected. The controller retrieves the detected parameters and compares the detected parameters with the corresponding thresholds. If the controller determines that one or more of the plurality of parameters do not satisfy the corresponding condition, the controller activates the cooling cycle.

If the vehicle speed and the ambient temperature are greater than the respective thresholds and the first temperature is greater than or equal to a lower threshold motor temperature, that is the first threshold motor temperature, the control unit does not activate the cooling cycle. The control unit deduces that the wind and ambient airflow may be sufficient to support cooling. The control unit constantly communicates with the sensors and compares the detected data with the respective thresholds. If the ambient temperature is less than the threshold ambient temperature, the control unit starts the cooling cycle to spray the fluid on the EPAS motor 102 or turns the engine fan ON as a part of the cooling cycle of the cooling system.

If the vehicle speed is less than the threshold speed, the ambient temperature is greater than the threshold ambient temperature and the first temperature greater than or equal to the lower threshold motor temperature, then the control unit begins the cooling cycle to spray the fluid on the EPAS motor 102. The control unit further activates the engine fan to run on a high speed. The control unit constantly monitors the rate of change of the first temperature. With the cooling cycle activated, if the first temperature does not decrease over a threshold time period or the first temperature is determined to be greater than an upper threshold motor temperature, the control unit will trigger a threshold temperature warning, such as to the driver or to a vehicle level control unit.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
an electric power assisted steering motor;
a first temperature sensor in the electric motor;
a first fluid reservoir;
a fluid transfer device coupled to the electric motor and coupled to the first fluid reservoir, the fluid transfer device including a channel that extends along a length of the electric motor;
a first pump coupled to the fluid reservoir and to the fluid transfer device; and
a control unit coupled to the first sensor and the first pump, the control unit configured to activate the first pump in response to temperature detected by the first sensor being greater than or equal to a first threshold motor temperature.

2. The system of claim 1 wherein the channel is a serpentine shape that extends from a first end to a second end of the electric power assisted steering motor.

3. The system of claim 2 wherein the channel is adjacent to an exterior surface of the electric power assisted steering motor.

4. The system of claim 2 wherein the channel is within a housing of the electric power assisted steering motor.

5. The system of claim 2, further comprising a sprayer coupled to the control unit and the first fluid reservoir.

6. The system of claim 5 wherein the fluid transfer device is configured to collect fluid from the sprayer from walls of the electric power assisted steering motor.

7. The system of claim 1, further comprising:
a second temperature sensor configured to detect ambient temperature;
a high-demand selection module;
an engine fan; and
a communication network coupled to the control unit, a vehicle mode selection module, and the second temperature sensor, the control unit configured to activate the engine fan in response to an active signal from the high-demand selection module and the ambient temperature being greater than a threshold ambient temperature.

8. The system of claim 7, further comprising:
a second fluid reservoir;
a sprayer coupled to the second fluid reservoir; and
the control unit coupled to the sprayer and configured to activate the sprayer in response to the temperature detected by the first sensor being greater than or equal to a first threshold motor temperature.

9. The system of claim 7, further comprising:
a second fluid reservoir;
a sprayer coupled to the second fluid reservoir; and
the control unit coupled to the sprayer and configured to activate the sprayer in response to the temperature detected by the first sensor being greater than or equal to a second threshold motor temperature.

10. The system of claim 9, further comprising a second pump coupled to the second fluid reservoir and the control unit.

11. The system of claim 1, further comprising a windshield washer fluid outlet, the first fluid reservoir coupled to the windshield washer fluid outlet.

12. The system of claim 11, further comprising a fluid level sensor in the first fluid reservoir, the fluid level sensor is coupled to the control unit.

13. The system of claim 12, further comprising:
a second fluid reservoir;
a sprayer coupled to the second fluid reservoir; and
the control unit coupled to the sprayer and configured to activate the sprayer in response to a level from the fluid level sensor being less than or equal to a first threshold level.

14. A vehicle, comprising:
an electric power assisted steering motor;
a first fluid reservoir coupled to a side of the electric power assisted steering motor, the fluid reservoir including a channel that extends along the side of the electric power assisted steering motor;
a first fluid path;
a second fluid path; and
a second fluid reservoir coupled to the first fluid reservoir by the first fluid path and the second fluid path, the second fluid reservoir including an opening.

15. The vehicle of claim 14, further comprising:
a first pump system coupled to the second fluid reservoir and the second fluid path;
an electric power assisted steering motor temperature sensor; and
a controller coupled to the first pump system and the electric power assisted steering motor temperature sensor, the controller configured to activate the first pump system in response to a temperature from the electric power assisted steering temperature sensor being greater than or equal to a first threshold temperature.

16. The vehicle of claim 15 wherein the first fluid reservoir includes a heat sink adjacent to the channel.

17. The vehicle of claim 16 wherein the heat sink includes a first surface adjacent to an exterior surface of the electric power assisted steering motor and a second surface that includes a plurality of extensions that extend away from the exterior surface of the electric power assisted steering motor.

18. A method, comprising:
automatically activating a cooling system of an electric motor in a vehicle by:
detecting a plurality of parameters of the vehicle;
comparing the plurality of parameters to a plurality of thresholds; and
activating the cooling system in response to at least one of the plurality of parameters exceeding a respective one of the plurality of thresholds.

19. The method of claim 18 wherein detecting the plurality of parameters includes:
detecting a first temperature of the electric motor; and
detecting a speed of the vehicle.

20. The method of claim 19, further comprising:
transmitting the first temperature and the speed by a communication network to an electronic control unit; and
activating a first pump in response to the first temperature being greater than or equal to a first threshold motor temperature, the activating including:
moving a fluid from a first reservoir with the first pump to the electric motor.

21. The method of claim 20 wherein moving the fluid includes spraying the fluid.

22. The method of claim 20, further comprising monitoring a fluid level of the first reservoir, the first reservoir being coupled to a windshield washer fluid outlet, and deactivating the first pump in response to the fluid level of the first reservoir being less than or equal to a threshold fluid level.

23. The method of claim 22, further comprising activating a sprayer in response to deactivating the first pump, the sprayer being coupled to a second fluid reservoir.

24. The method of claim 19 wherein detecting the plurality of parameters includes:
detecting a first temperature of the electric motor;
detecting a speed of the vehicle;
detecting an ambient temperature;
detecting a gear angle of a steering wheel;
detecting a selection of an extreme maneuver mode of the vehicle; and
detecting a status of an engine fan.

25. The method of claim 24 wherein comparing the plurality of parameters to a plurality of thresholds includes comparing:
the first temperature to a lower threshold motor temperature;
the speed to a threshold speed;
the ambient temperature to a threshold ambient temperature; and
the gear angle to a threshold gear angle.

26. The method of claim 25 wherein activating the cooling system includes transferring fluid from a first reservoir to the motor in response to the selection of the extreme maneuver mode indicating an on state and the gear angle exceeding the threshold gear angle.

27. The method of claim 25 wherein activating the cooling system includes transferring fluid from a first reservoir to the motor in response to the selection of the extreme maneuver mode indicating an on state and the first temperature exceeding the lower threshold motor temperature.

28. The method of claim 25 wherein activating the cooling system includes transferring fluid from a first reservoir to the motor in response to the selection of the extreme maneuver mode indicating an on state, the speed being below the threshold speed, and the first temperature exceeding the lower threshold motor temperature.

29. The method of claim 25 wherein activating the cooling system includes transferring fluid from a first reservoir to the motor in response to the selection of the extreme maneuver mode indicating an on state, the speed being below the threshold speed, the ambient temperature exceeding the threshold ambient temperature, and the status of the engine fan indicating off.

30. The method of claim 25 wherein activating the cooling system includes:
transferring fluid from a first reservoir to the first temperature exceeding the lower threshold motor temperature;
continuing to determine the first temperature; and
generating a warning in response to the first temperature exceeding an upper threshold motor temperature.

31. The method of claim 18 wherein detecting the plurality of parameters of the vehicle includes:
sensing a first temperature within the electric power assisted steering motor;
detecting a vehicle drive mode status with a communication network; and in response to the first temperature exceeding a threshold motor temperature and the vehicle drive mode status indicating a high-demand driving mode, activating a first fluid flow path from a first fluid reservoir to the motor.

32. The method of claim 18 wherein detecting the plurality of parameters of the vehicle includes:
   detecting a vehicle drive mode status with a communication network; and
   in response to the vehicle drive mode status indicating a high-demand driving mode, activating an motor polling sequence.

\* \* \* \* \*